United States Patent [19]

Wold

[11] 4,399,999
[45] Aug. 23, 1983

[54] SEGMENTED ANNULAR SEAL FOR MISSLE LAUNCH TUBE

[75] Inventor: Donald C. Wold, Sunnyvale, Calif.

[73] Assignee: Westinghouse Electric Corp., Pittsburgh, Pa.

[21] Appl. No.: 366,459

[22] Filed: Apr. 8, 1982

[51] Int. Cl.³ .................... F16J 15/10; F16J 15/32; F41F 3/04

[52] U.S. Cl. .................... 277/199; 277/152; 277/205; 277/212 F; 89/1.816

[58] Field of Search .......... 277/152, 153, 205, 212 R, 277/212 C, 212 F, 212 FB, 12, 32, 192, 199; 89/1.8, 1.809, 1.810, 1.816

[56] References Cited

U.S. PATENT DOCUMENTS

| 3,144,255 | 8/1964 | Thorne et al. | 277/199 X |
| 3,289,533 | 12/1966 | Brown | 89/1.810 |
| 3,857,321 | 12/1974 | Cohen | 89/1.816 X |
| 4,033,593 | 7/1977 | Molnar et al. | 277/212 F |

FOREIGN PATENT DOCUMENTS

| 550835 | 9/1956 | Belgium | 277/205 |
| 1442532 | 5/1966 | France | 277/152 |
| 575725 | 4/1958 | Italy | 277/199 |

*Primary Examiner*—Robert S. Ward, Jr.
*Attorney, Agent, or Firm*—F. J. Baehr, Jr.

[57] ABSTRACT

A seal for a large annular space formed from a plurality of overlapping seal segments disposed in a circular array; each seal segment having step margins which overlap when the segments are abutting each other in a circular array, each seal segment also having a sealing portion disposed at an angle with respect to a base portion which fits a cylindrical surface, and there is a groove on the low pressure side of the seal portion adjacent the juncture of the seal portion with the base forming a one directional hinge between the base portion and the sealing portion.

7 Claims, 6 Drawing Figures

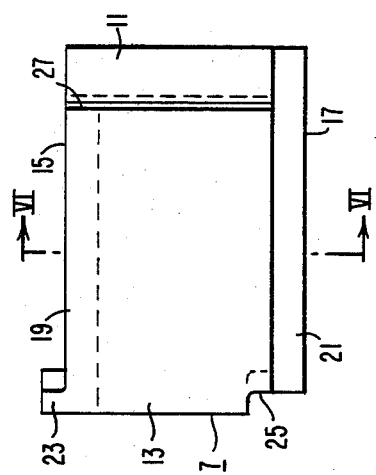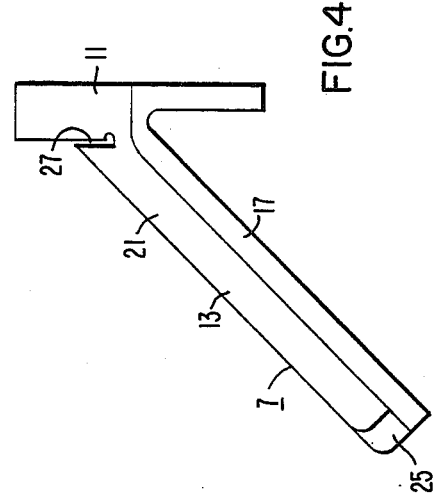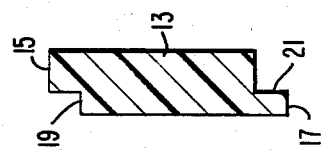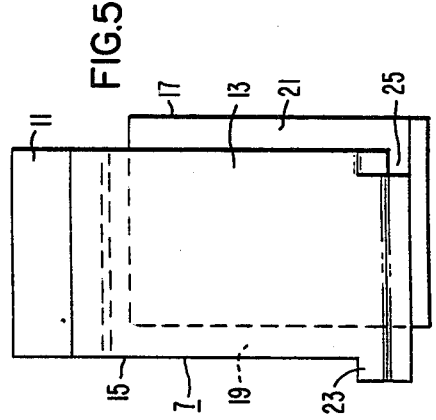

4,399,999

SEGMENTED ANNULAR SEAL FOR MISSILE LAUNCH TUBE

GOVERNMENT CONTRACT

The United States Government has rights in this invention pursuant to the terms of Contract No. RHO-110203 awarded by the Department of Defense.

CROSSREFERENCE TO RELATED APPLICATION

An application entitled "A Resilient High Modulus Polyurethane Elastomer", assigned Ser. No. 366,457 and filed by the same assignee concurrently with this application, is closely related.

BACKGROUND OF THE INVENTION

This invention relates to a segmented seal and more particularly to a launch seal for a missile.

Launch seals are disposed between a launch tube and a missile and operate to retain the pressure generated by a gas generator utilized to eject the missile from the launch tube. The seal must enclose a relatively large annular opening and withstand pressures in the neighborhood of 300 pounds per square inch without inverting or flipping through during the launch.

Additional problems are encountered when the bore of the launch tube is to be clean, that is, the shock supports and launch seals are attached to the missile rather than to the launch tube as this complicates loading of the missile in the launch tube and requires that the shock pads and launch seal separate from the missile as it exits from the launch tube or shortly thereafter.

SUMMARY OF THE INVENTION

In general, a seal segment to be disposed in a circular array of seal segments to form a seal for a large annular space, when made in accordance with this invention, each seal segment comprises a base portion, which fits a cylindrical surface, a seal portion, which extends from the base portion so as to form an acute angle between a high pressure side of the seal portion and the base. Each seal portion has longitudinal margins with diagonally opposed steps that overlap when one seal segment is abutted against another to form the circular array of seal segments and each seal portion has a groove extending across the low pressure side of the seal portion at the juncture of the seal portion and the base portion.

BRIEF DESCRIPTION OF THE DRAWINGS

The objects and advantages of this invention will become more apparent by reading the following detailed description in conjunction with the accompanying drawings, in which:

FIG. 3 is a plan view of a seal segment;

FIGS. 4 and 5 are elevational views of the seal segment; and

FIG. 6 is a sectional view taken on line VI—VI of FIG. 3.

DESCRIPTION OF THE PREFERRED EMBODIMENT

Figure 1:
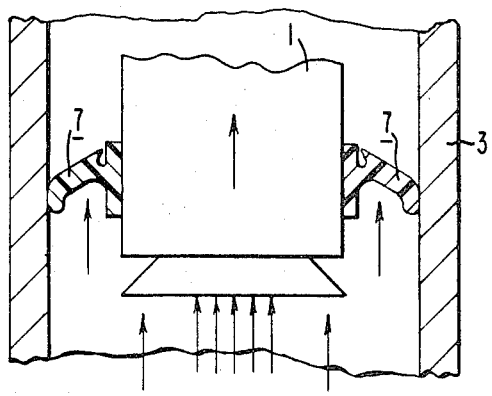
FIG. 1 is a partial sectional view of a missile being ejected from a launch tube.

Referring now to the drawings in detail and in particular to FIG. 1, there is shown a missile 1 being ejected from a smooth bore of a launch tube 3. A gas generator (not shown) cooperates with an annular seal 5 to produce a pressure within the launch tube 3 that acts on the underside of the missile 1 to eject it from the launch tube 3. If, as shown in FIG. 1, the annular seal 5 is disposed on the missile, it must be separable therefrom, when the missile 1 exits the launch tube 3; it must allow loading of the missile from the muzzle end of a launch tube 3; and it must be able to absorb lateral shock loads without producing large radial and circumferential loads on the missile.

Figure 2:
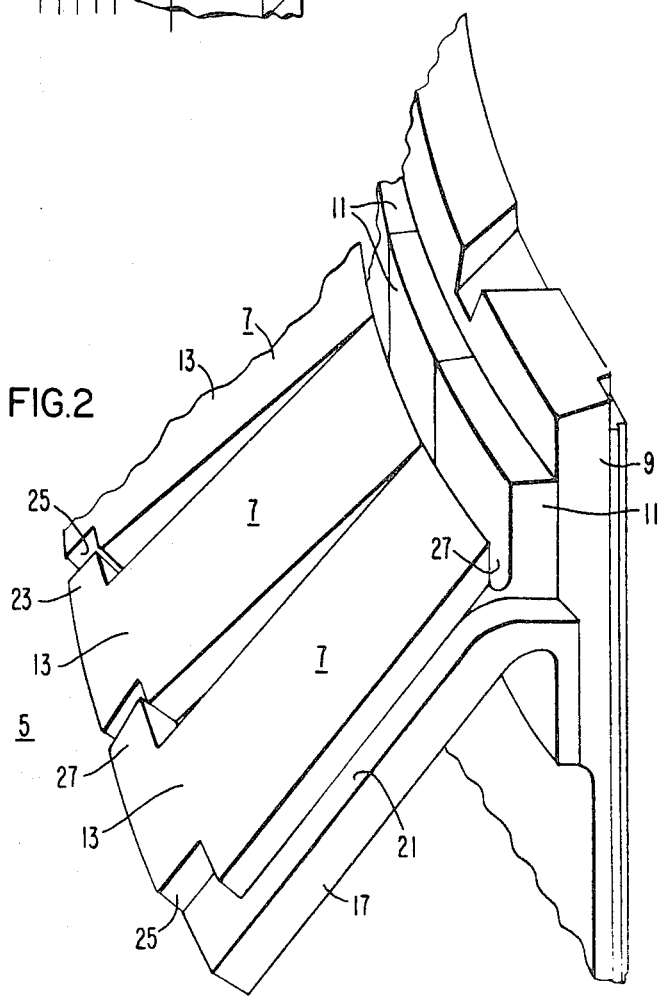
FIG. 2 is a partial perspective view of an array of seal segments.

As shown in FIG. 2, the annular seal 5 is formed from a plurality of seal segments 7 disposed in a circular array around the missile 1 to seal the large annular space between the missile 1 and the launch tube 3. The seal segments 7 are affixed to a segmented base plate 9 which separates from the missile as the missile exits the launch tube 3 or shortly thereafter.

As shown in FIGS. 3, 4, 5 and 6, each seal segment 7 comprises a base portion 11 which fits a cylindrical surface on the base plate 9 and is formed in such a manner that the low pressure portion of the base portion 11 is thicker than the high pressure portion thereof. Extending from the base portion 11 so as to form an acute angle therewith is a seal portion 13. The acute angle is formed on the high pressure side of the seal portion 13. The seal portion 13 has longitudinal generally parallel margins 15 and 17 with diagonally opposed steps 19 and 21 that overlap when one seal segment 7 is abutted against another seal segment 7 to form the annular array of seal segments. The distal end of each seal portion 13 has a protrusion 23 extending from the step 19 and the opposing riser has a notch 25 which accepts or registers with the protrusion 23 when the seal segments 7 abut each other, forming a lock on the distal end of the seal segments 7.

As shown best in FIG. 4, a groove 27 extends across the low pressure side of each seal portion 13 at the juncture of the seal portion 13 and the base portion 11 forming a one directional hinge between the base portion 11 and the seal portion 13. The bottom of the groove 27 is rounded and is larger in diameter than the thickness of the groove and is so disposed as to extend only into the base portion 11.

The seal hereinbefore described can modulate radially without imposing shear or tensile loads other than that resulting from friction and it provides for minimal radial loading of the missile interface with radial displacement of the missile.

What is claimed is:

1. A seal segment to be disposed in a circular array of seal segments to form a seal for a large annular space, said seal segment comprising:

a base portion, which fits a cylindrical surface;

a seal portion which extends from said base so as to form an acute angle between a high pressure side of said seal portion and said base;

said seal portion having longitudinal margins with diagonally opposed steps that overlap when one seal segment is abutted against another to form the circular array of seal segments; and a groove extending across a low pressure side of said seal portion at the juncture of said seal portion and said base portion.

2. A seal segment as set forth in claim 1, wherein the distal end of the seal portion has a protrusion extending from the step and the opposing riser has a notch, which will accept said protrusion.

3. A seal segment as set forth in claim 1, wherein the base portion on the low pressure side of the seal portion is thicker than the base portion on the high pressure side of the seal portion.

4. A seal segment as set forth in claim 1, wherein the groove has a circular bottom.

5. A seal segment as set forth in claim 4, wherein the circular bottom portion of the groove is enlarged.

6. A seal segment as set forth in claim 4, wherein the circular bottom portion of the groove is enlarged in such a manner that it extends only into the base portion.

7. A seal segment as set forth in claim 1, wherein the longitudinal margins of the seal portion are generally parallel.

* * * * *